United States Patent
Cronquist

Patent Number: 5,035,438
Date of Patent: Jul. 30, 1991

[54] GULL WING CART APPARATUS

[76] Inventor: Tom A. Cronquist, P.O. Box 291, Boonville, Calif. 95415

[21] Appl. No.: 532,717

[22] Filed: Jun. 4, 1990

[51] Int. Cl.⁵ .............................................. B62B 3/04
[52] U.S. Cl. ..................................... 280/79.5; 248/98; 248/129
[58] Field of Search ................... 280/79.5, 79.6, 79.11; 248/98, 97, 99, 129, 313, 907; 24/20 R, 589, 24, 380

[56] References Cited

U.S. PATENT DOCUMENTS

| | | | |
|---|---|---|---|
| 646,010 | 3/1900 | Rhodes | 248/98 |
| 978,344 | 12/1910 | Wirt | 280/47.34 |
| 1,638,203 | 8/1927 | Jetel | 248/98 |
| 2,094,228 | 9/1937 | Zook | 24/589 |
| 3,142,465 | 7/1964 | Hellner | 248/97 |
| 3,384,385 | 5/1968 | Cohen et al. | 280/79.2 |
| 4,222,580 | 9/1980 | Krokonko | 280/47.34 |
| 4,313,612 | 2/1982 | Rubens | 280/79.11 |
| 4,685,859 | 8/1987 | Marshal | 414/590 |

Primary Examiner—David M. Mitchell
Attorney, Agent, or Firm—Henderson & Sturm

[57] ABSTRACT

A gull winged wheeled cart apparatus (10) for holding elongated rolls (101) of flooring material; wherein the apparatus (10) comprises a wheeled base unit (11) having elongated front (18) and rear (19) support members and a pair of curved capture arms (25) are adapted to be releasably secured to the front support member (18).

4 Claims, 1 Drawing Sheet

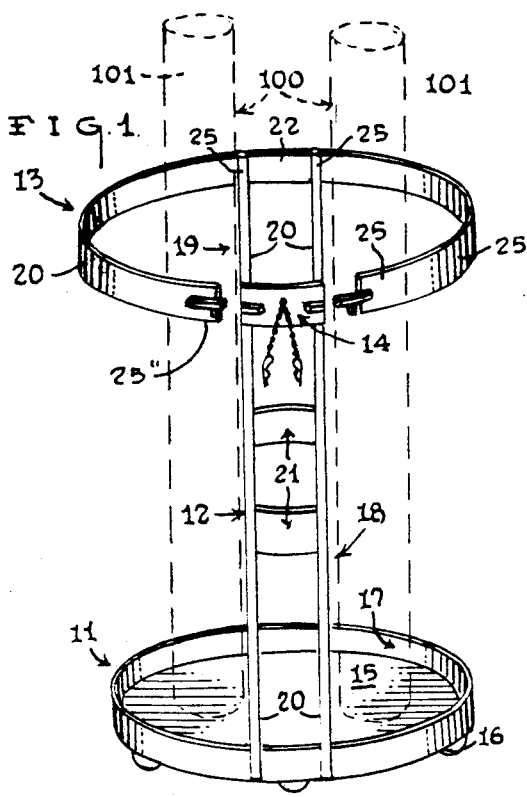
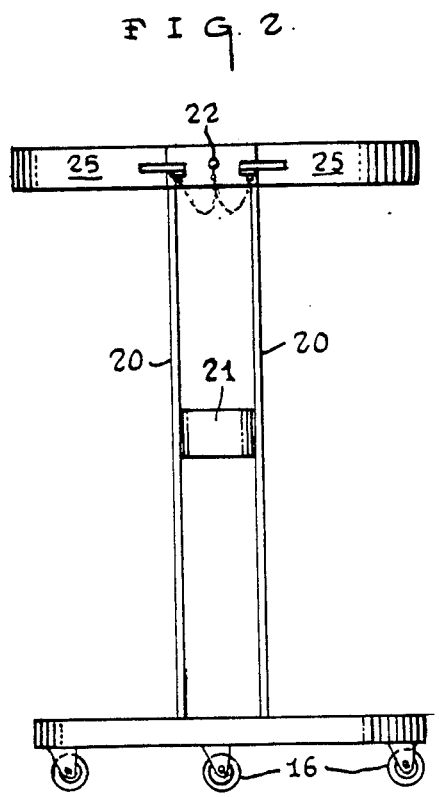
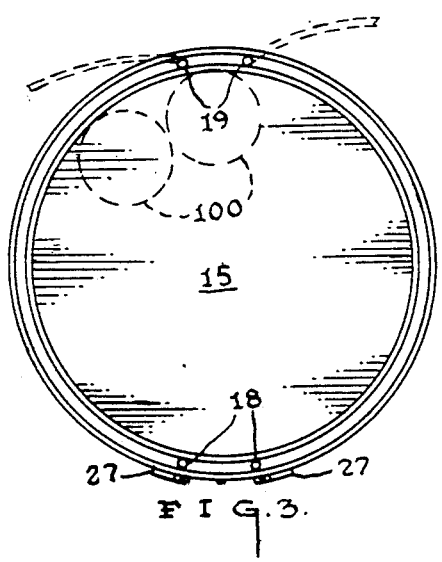
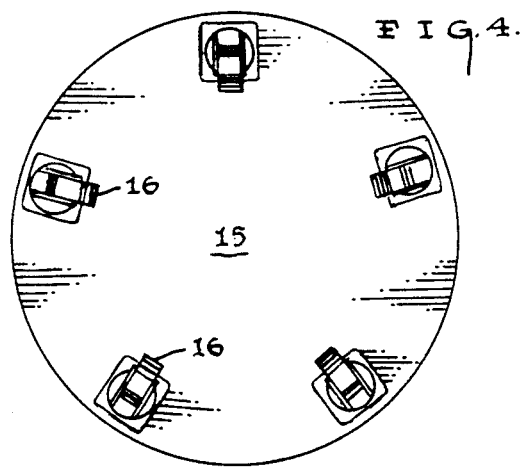
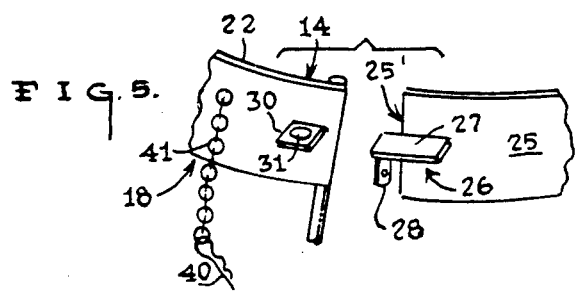

GULL WING CART APPARATUS

TECHNICAL FIELD

The present invention relates to the field of wheeled carts in general, and in particular to a cart apparatus that is specifically designed to accommodate large rolls of material such as carpeting and linoleum.

BACKGROUND ART

As can be seen by reference to the following U.S. Pat. Nos. 4,313,612; 4,222,580; 3,384,385; and 4,685,859; the prior art is replete with myriad and diverse wheeled cart constructions.

While all of the aforementioned prior art constructions are more than adequate for the basic purpose and function for which they have been specifically designed, these previously patented structures are neither designed nor adapted for use in transporting large rolls of material.

As anyone who has had any experience with handling rolls of carpet or linoleum is aware, the rolls are very cumbersome to maneuver when placed in a vertical orientation due to the inherent instability produced by a relatively high center of gravity.

In addition, to complicate matters even further, there are many instances wherein the vertical orientation of elongated rolls is desirable such as from the standpoint of floor space savings during storage and while transporting the rolls down narrow aisles and around tight corners.

DISCLOSURE OF THE INVENTION

Briefly stated, the wheeled cart apparatus that forms the basis of the present invention comprises a wheeled base unit, a plurality of vertical support units, a plurality of capture units, and a locking unit.

The wheeled base unit comprises a platform member supported on wheels and having raised sides which will prevent the bottom of the elongated rolls from slipping off he platform member.

The vertical support units comprise front and rear elongated support members wherein the capture units comprise a plurality of arcuate capture arms that are pivotally secured to the rear support members and releasably engaged by the locking unit which is disposed on the front support member.

As will be explained in greater detail further on in the specification, the wheeled cart apparatus of this invention is designed to permit the insertion and removal of elongated rolls of material in an upright manner from both sides of the cart apparatus wherein the capture arms form a gull wing type relationship relative to the elongated rolls of material.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the wheeled cart apparatus;

FIG. 2 is a front elevation view of the apparatus;

FIG. 3 is a top plan view of the apparatus;

FIG. 4 is a bottom plan view of the apparatus; and,

FIG. 5 is an enlarged detail view of the locking unit.

BEST MODE FOR CARRYING OUT THE INVENTION

As can be seen by reference to the drawings, and in particular to FIG. 1, the wheeled cart apparatus that forms the basis of the present invention is designed generally by the reference numeral (10). The apparatus (10) comprises in general: a wheeled base unit (11) vertical support units (12) capture units (13) and a locking unit (14).

As shown in FIGS. 1 through 4, the wheeled base unit (11) comprises a generally flat circular base member (15) supported by a plurality of wheeled caster elements (16) in a well recognized manner; wherein, the base member (15) is provided with a raised peripheral lip (17) whose purpose and function will be described further on in the specification.

Turning now to FIGS. 1 through 3 it can be seen that the vertical support units (12) comprise front (18) and rear (19) relatively elongated support members; wherein, each support member (18)(19) includes a pair of support legs (20) secured on their bottom ends to the raised lip (17) of the base member (15); and, wherein the support legs (20) are connected together by an intermediate (21) and an upper (22) stiffening plate element.

Still referring to FIGS. 1 through 3, it can be seen that the capture units (13) comprise a pair of curved arm members (25) which are pivotally secured on one end (25') to the upper plate element (22) on the rear support member (19); and, which are provided on their free ends (25") with a catch element (26).

In the preferred embodiment of the invention depicted in FIG. 5 the catch element (26) comprises a bracket (27) which is secured to, and projects beyond, the free end (25') of each capture arm (25); wherein, the bracket (27) is further provided with a downwardly depending apertured post (28), whose purpose and function will be described presently.

As can be seen by reference to FIGS. 1, 2 and 5, the locking unit (14) comprises a pair of apertured tangs (30) having enlarged apertures (31) which are dimensioned to receive the apertured posts (28) on the catch elements (26); wherein, the tangs (30) are disposed proximate the edges of the upper stiffening plate element (22) on the front support member (18).

In addition the locking unit (14) further comprises a pair of locking pins (40) attached by a chain element (41) to the upper stiffening plate element (22) on the front support member (18); wherein, the locking pins (40) are dimensioned to releasably engage the apertured posts (28) on the capture arms (25).

By now it should be appreciated that the gull wing wheeled cart apparatus (10) that forms the basis of the present invention is particularly well suited for accommodating and transporting a plurality of elongated generally cylindrical objects (100) such as rolls (101) of flooring such as carpet or linoleum shown in phantom in FIGS. 1 and 3.

In addition it should further be appreciated that the upper ends of the elongated support members (18) and (19) are positioned proximate to the center of gravity of the elongated cylindrical objects (100) and the raised peripheral lip (17) provides lateral stability to the lower and intermediate portions of the objects.

Furthermore the gull wing shaped capture arms (25) allow the cylindrical objects to be loaded and removed from either side of the apparatus (10); and, the curvature of the capture arms complements the curved periphery of the elongated rolls (101).

It should also be noted that while a specific locking unit (14) has been described in the specification, it is to be understood that any suitable locking arrangement could be substituted therefor in keeping with the teachings of this invention.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A wheeled gull wing cart apparatus in combination with elongated generally cylindrical objects such as rolls of flooring material wherein the apparatus comprises:
    a wheeled base unit including a generally flat circular base member having a raised peripheral lip;
    support units comprising relatively elongated front and rear support members wherein the bottom of the support members are attached to the base member and the upper portion of the support members are provided with at least one plate element; wherein, the front and rear support members each include a pair of support legs connected together by said at least one plate element;
    capture units comprising curved capture arms pivotally secured to the upper portion of the rear support member; and,
    means on said front support member for releasably securing the other end of the capture arms to the front support member; wherein, the capture arms are disposed at a height generally proximate to the midpoint of the said elongated generally cylindrical objects.

2. The apparatus as in claim 1; wherein, the means for releasably securing the said other ends of the capture arms to the front support member comprise:
    a tang having an enlarged aperture; and,
    a bracket having a downwardly projecting post.

3. The apparats as in claim 2; wherein said downwardly depending post is apertured.

4. The apparatus as in claim 3, further comprising a locking pin adapted to releasably engage the aperture post.

* * * * *